US011912597B2

(12) United States Patent
Sugiyama et al.

(10) Patent No.: US 11,912,597 B2
(45) Date of Patent: Feb. 27, 2024

(54) SLUDGE DRYING APPARATUS

(71) Applicant: DISCO CORPORATION, Tokyo (JP)

(72) Inventors: Satoshi Sugiyama, Tokyo (JP); Toshiyuki Sano, Tokyo (JP); Miki Yoshida, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 1033 days.

(21) Appl. No.: 16/796,308

(22) Filed: Feb. 20, 2020

(65) Prior Publication Data

US 2020/0270159 A1    Aug. 27, 2020

(30) Foreign Application Priority Data

Feb. 21, 2019   (JP) ................. 2019-029418

(51) Int. Cl.
| | | |
|---|---|---|
| *C02F 11/12* | (2019.01) | |
| *B03C 5/02* | (2006.01) | |
| *B65G 45/18* | (2006.01) | |
| *F26B 13/10* | (2006.01) | |
| *C02F 103/34* | (2006.01) | |

(52) U.S. Cl.
CPC ............. *C02F 11/12* (2013.01); *B03C 5/02* (2013.01); *B65G 45/18* (2013.01); *F26B 13/103* (2013.01); *F26B 13/108* (2013.01); *C02F 2103/34* (2013.01)

(58) Field of Classification Search
CPC ..... C02F 11/12–16; B03C 5/00; B24B 55/06; F26B 21/02; F26B 17/023
See application file for complete search history.

(56) References Cited

U.S. PATENT DOCUMENTS

| | | | | |
|---|---|---|---|---|
| 4,756,092 A * | 7/1988 | Anderson | ............. | F26B 17/023 |
| | | | | 34/182 |
| 5,428,904 A * | 7/1995 | Rutz | ..................... | F26B 21/083 |
| | | | | 34/224 |
| 11,352,285 B2 * | 6/2022 | Sugiyama | ............... | B24B 55/06 |

FOREIGN PATENT DOCUMENTS

| | | |
|---|---|---|
| DE | 102008056739 A1 | 5/2010 |
| JP | 06241656 A | 9/1994 |
| JP | 2013119050 A | 6/2013 |

(Continued)

OTHER PUBLICATIONS

Sugiyama et al.;U.S. Appl. No. 17/191,938, filed Mar. 4, 2021.

(Continued)

*Primary Examiner* — Luan V Van
*Assistant Examiner* — Andrew Koltonow
(74) *Attorney, Agent, or Firm* — Greer, Burns & Crain, Ltd.

(57) ABSTRACT

A sludge drying apparatus includes a waste fluid bath for storing a waste fluid containing a sludge, an extracting unit for extracting the sludge from the waste fluid stored in the waste fluid bath, a transfer belt for transferring the sludge extracted by the extracting unit, a drying unit for drying the sludge to be transferred by the transfer belt, and a recovering unit for recovering the sludge transferred by the transfer belt and dried by the drying unit. The recovering unit includes a roll brush provided adjacent to the air outlet so as to horizontally extend in the direction perpendicular to the direction of extension of the transfer belt, and a recovery box for recovering the sludge separated from the transfer belt by the roll brush.

3 Claims, 5 Drawing Sheets

(56) References Cited

FOREIGN PATENT DOCUMENTS

JP           2016049506 A   *   4/2016
JP           2016049506 A      4/2016

OTHER PUBLICATIONS

Sugiyama et al; U.S. Appl. No. 16/677,148, filed Nov. 7, 2019.
Office Action issued in counterpart German patent application No. 10 2020 202 002.7, dated May 10, 2021.

* cited by examiner

SLUDGE DRYING APPARATUS

BACKGROUND OF THE INVENTION

Field of the Invention

The present invention relates to a sludge drying apparatus for recovering a sludge having a high water content from a waste fluid and then drying the sludge, the waste fluid containing powder of a workpiece ground by abrasive members in the condition where a grinding water is supplied to the workpiece.

Description of the Related Art

In grinding a workpiece by using abrasive members as supplying a grinding water, grinding dust is generated from the workpiece in the condition where it is mixed in the grinding water to form a waste fluid. The grinding dust (sludge) having a high water content is recovered by precipitating the grinding dust in the waste fluid or by immersing a positive plate and a negative plate in the waste fluid and next applying electric charges to the positive plate and the negative plate to thereby deposit the sludge on the positive plate. Further, the water left by removing the sludge from the waste fluid is reused (see JP 2013-119050A, for example). Further, in a sludge recovering apparatus as disclosed in JP 2016-049506A, for example, the sludge recovered is dried to be used.

SUMMARY OF THE INVENTION

However, in the sludge recovering apparatus disclosed in JP 2016-049506A, a heater is used to dry the sludge. Accordingly, when the maintenance of the sludge recovering apparatus is required, an operator must wait until any component heated by the heater is cooled.

Further, electric power for operating the heater is required. Further, the sludge is dried to become fine powder, which may fly in a drying chamber to contaminate the inside of the drying chamber. As another problem, the sludge being transferred by a transfer belt may be melted by the heat from the heater and then may adhere to the transfer belt.

It is therefore an object of the present invention to provide a sludge drying apparatus which can dry a sludge without using a heater and can recover the sludge dried to be powdered without contaminating the inside of the drying chamber.

In accordance with an aspect of the present invention, there is provided a sludge drying apparatus for recovering a sludge having a high water content from a waste fluid and then drying the sludge, the waste fluid containing powder of a workpiece ground by abrasive members in the condition where a grinding water is supplied to the workpiece, the sludge drying apparatus including: a waste fluid bath for storing the waste fluid; extracting means for extracting the sludge from the waste fluid stored in the waste fluid bath; a transfer belt for transferring the sludge extracted by the extracting means; drying means for drying the sludge to be transferred by the transfer belt; and recovering means for recovering the sludge transferred by the transfer belt and dried by the drying means, in which the drying means includes a drying box configured so as to cover at least an upper surface of the transfer belt and extend in a direction of extension of the transfer belt, a sludge inlet formed at one end of the drying box in a direction of extension thereof for introducing the sludge onto the transfer belt, an air outlet formed at the other end of the drying box in the direction of extension thereof for discharging air in the drying box, a blower fan provided outside the drying box for sucking the air in the drying box from the air outlet and thereby returning the exhaust air into the drying box, and a return inlet formed near the sludge inlet for returning the exhaust air sucked by the blower fan into the drying box, and the recovering means includes a roll brush provided adjacent to the air outlet so as to horizontally extend in a direction perpendicular to the direction of extension of the transfer belt, rotating means for rotating the roll brush in the condition where bristle ends of the roll brush are in contact with the upper surface of the transfer belt, a recovery box for recovering the sludge dried on the transfer belt by the drying means and separated from the transfer belt by the roll brush, a first communication passage for making communication between the air outlet and the recovery box, and a second communication passage for making communication between the recovery box and the blower fan.

Preferably, the drying means further includes an air inlet formed at one end of the drying box in the direction of extension thereof for introducing outside air into the drying box; and a dividing portion for dividing flow rate of the exhaust gas sucked from the air outlet through the recovery box by the blower fan, into two parts.

According to the present invention, there is no possibility that the sludge dried may fly in the air in the drying box for a long period of time, thereby preventing contamination of the inside of the drying box.

Further, since the sludge is dried without using a heater, power consumption in the sludge drying apparatus can be suppressed and the sludge having a low melting point can be dried without being melted on the transfer belt by the heat from the heater. Further, in the case of replacing the transfer belt or cleaning the inside of the drying box, an operator is not required to wait until the heater is cooled.

In the case that the sludge drying apparatus further includes the air inlet formed at one end of the drying box in the direction of extension thereof for introducing the outside air into the drying box and the dividing portion for dividing the flow rate of the exhaust gas sucked from the air outlet through the recovery box by the blower fan, into two parts, a part of the exhaust gas divided by the dividing portion can be returned into the drying box from the return inlet, so that the sludge being transferred by the transfer belt can be efficiently dried. Further, in drying the sludge, hydrogen is generated in the drying box due to the contact of the air and the sludge. However, unlike the case of heater drying, the hydrogen generated is not accumulated in the drying box. That is, an increase in concentration of the hydrogen in the drying box can be suppressed to thereby prevent hydrogen explosion. Further, the amount of exhaust gas to be sent to an exhaust apparatus in factory equipment, for example, can be reduced by the dividing portion to thereby reduce a load on the exhaust apparatus in the factory equipment.

The above and other objects, features, and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
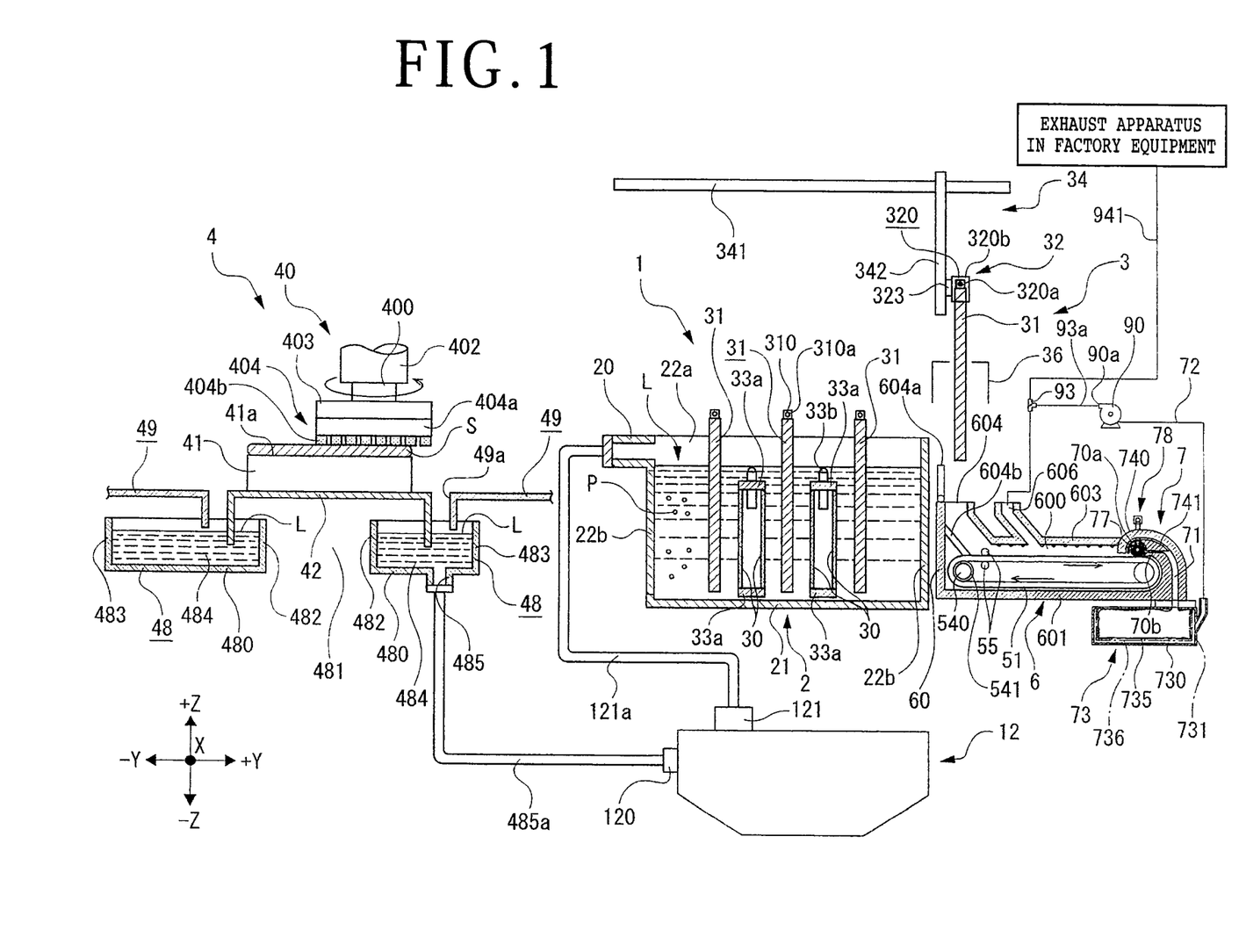
FIG. 1 is a sectional view depicting the structure of a grinding apparatus and a sludge drying apparatus according to a preferred embodiment of the present invention.

Referring to FIG. 1, a sludge drying apparatus 1 according to a preferred embodiment of the present invention is depicted. A grinding apparatus 4 having abrasive members 404b is provided near the sludge drying apparatus 1. In the grinding apparatus 4, a workpiece S as a solid material is ground by the abrasive members 404b in the condition where a grinding water is supplied to the workpiece S. Accordingly, a waste fluid L containing powder P of the workpiece S ground by the abrasive members 404b is discharged from the grinding apparatus 4. The sludge drying apparatus 1 is an apparatus for recovering the powder P, or a sludge P containing water from the waste fluid L and then drying the sludge P. While the sludge drying apparatus 1 is separated from the grinding apparatus 4 in this preferred embodiment, the sludge drying apparatus 1 may be incorporated in the grinding apparatus 4.

As a modification, the sludge drying apparatus 1 may be connected to a cutting apparatus having a rotatable cutting blade for cutting the workpiece S (e.g., silicon wafer) as supplying a cutting water to the workpiece S, in which a sludge P containing water is recovered from a waste fluid discharged from the cutting apparatus.

The grinding apparatus 4 depicted in FIG. 1 essentially includes a holding table 41 for holding the workpiece S and grinding means 40 including a rotatable grinding wheel 404 having the abrasive members 404b for grinding the workpiece S. While the workpiece S is a silicon wafer in this preferred embodiment, the workpiece S may be a silicon ingot as a solid cylindrical workpiece.

The grinding apparatus 4 includes a base 49 having an upper opening 49a. The holding table 41 is provided on the base 49. The holding table 41 has a holding surface 41a formed from a porous member, for example. The holding surface 41a is connected to a vacuum source (not depicted). The holding table 41 is rotatable about its axis extending in the Z direction. The holding table 41 is supported by a table support 42 provided in the upper opening 49a of the base 49. The table support 42 is movable in the X direction (in the direction perpendicular to the sheet plane of FIG. 1) by X moving means (not depicted) including a motor and a ball screw mechanism.

A boxlike water case 48 for receiving the waste fluid L from the grinding means 40 is provided below the holding table 41. A part of the water case 48 is depicted on both sides of the path of movement of the holding table 41, that is, along the opposite side surfaces of the table support 42 in the Y direction. Although not depicted, the other part of the water case 48 is provided along the opposite side surfaces of the table support 42 in the X direction. That is, the water case 48 has a gutter portion 484 for receiving the waste fluid L. The gutter portion 484 has a rectangular shape as viewed in plan in such a manner that a central rectangular opening 481 is defined. The gutter portion 484 is composed of a bottom plate 480, an inside wall 482, and an outside wall 483. Accordingly, the central opening 481 is surrounded by the inside wall 482. The inside wall 482 and the outside wall 483 are connected at their lower ends to the bottom plate 480 to thereby define a rectangular ring space for storing the waste fluid L. The bottom plate 480 is formed with a drain opening 485 for discharging the waste fluid L. A drain pipe 485a is connected at one end thereof to the drain opening 485. The other end of the drain pipe 485a is connected to a tank 12 for storing the waste fluid L. Accordingly, the waste fluid L containing the powder P (e.g., silicon powder) of the workpiece S ground by the abrasive members 404b falls down from the holding table 41 and is received by the gutter portion 484 of the water case 48. Thereafter, the waste fluid L is sent from the drain opening 485 through the drain pipe 485a to the tank 12.

The grinding means 40 depicted in FIG. 1 includes a spindle 400 having an axis extending in the Z direction perpendicular to the holding surface 41a of the holding table 41, a motor 402 for rotationally driving the spindle 400, a mount 403 fixed to the lower end of the spindle 400, and a grinding wheel 404 detachably connected to the mount 403. The grinding wheel 404 is composed of an annular wheel base 404a and a plurality of abrasive members 404b fixed to the lower surface of the wheel base 404a so as to be arranged annularly at given intervals. Each abrasive member 404b has an outside shape like a substantially rectangular prism. Each abrasive member 404b is formed by binding diamond abrasive grains or the like with a suitable bond.

The grinding means 40 is vertically movable in the Z direction (vertical direction). For example, a water passage (not depicted) for supplying a grinding water is formed inside the spindle 400 so as to extend in the axial direction (Z direction) of the spindle 400. The water passage is connected to a grinding water source (not depicted). The water passage opens to the lower surface of the wheel base 404a so as to discharge the grinding water toward the abrasive members 404b. As a modification, a grinding water nozzle may be provided at a position adjacent to the grinding wheel 404 of the grinding means 40 in the condition where the grinding means 40 is lowered to a grinding position for grinding the workpiece S. In this case, the grinding water is supplied from the grinding water nozzle directly to the position where the abrasive members 404b come into contact with the workpiece S.

As depicted in FIG. 1, the sludge drying apparatus 1 essentially includes a waste fluid bath 2 for storing the waste fluid L, extracting means 3 for extracting a sludge P having a high water content from the waste fluid L stored in the waste fluid bath 2, a transfer belt 51 for transferring the sludge P extracted by the extracting means 3, drying means 6 for drying the sludge P to be transferred by the transfer belt 51, and recovering means 7 for recovering the sludge P transferred by the transfer belt 51 and dried by the drying means 6.

For example, the tank 12 for storing the waste fluid L is located at a level lower than that of the drain opening 485 of the water case 48 depicted in FIG. 1. The tank 12 has an inlet opening 120. One end of the drain pipe 485a is connected to the drain opening 485, and the other end of the drain pipe 485a is connected to the inlet opening 120 of the tank 12. The tank 12 also has a delivery pump 121 for raising the waste fluid L containing the powder P of the workpiece S and sending it to the waste fluid bath 2. That is, the delivery pump 121 functions to send the waste fluid L containing the powder P from the tank 12 through a delivery pipe 121a to the waste fluid bath 2. The waste fluid bath 2 has an inlet opening 20 connected to the delivery pipe 121a.

Figure 2:
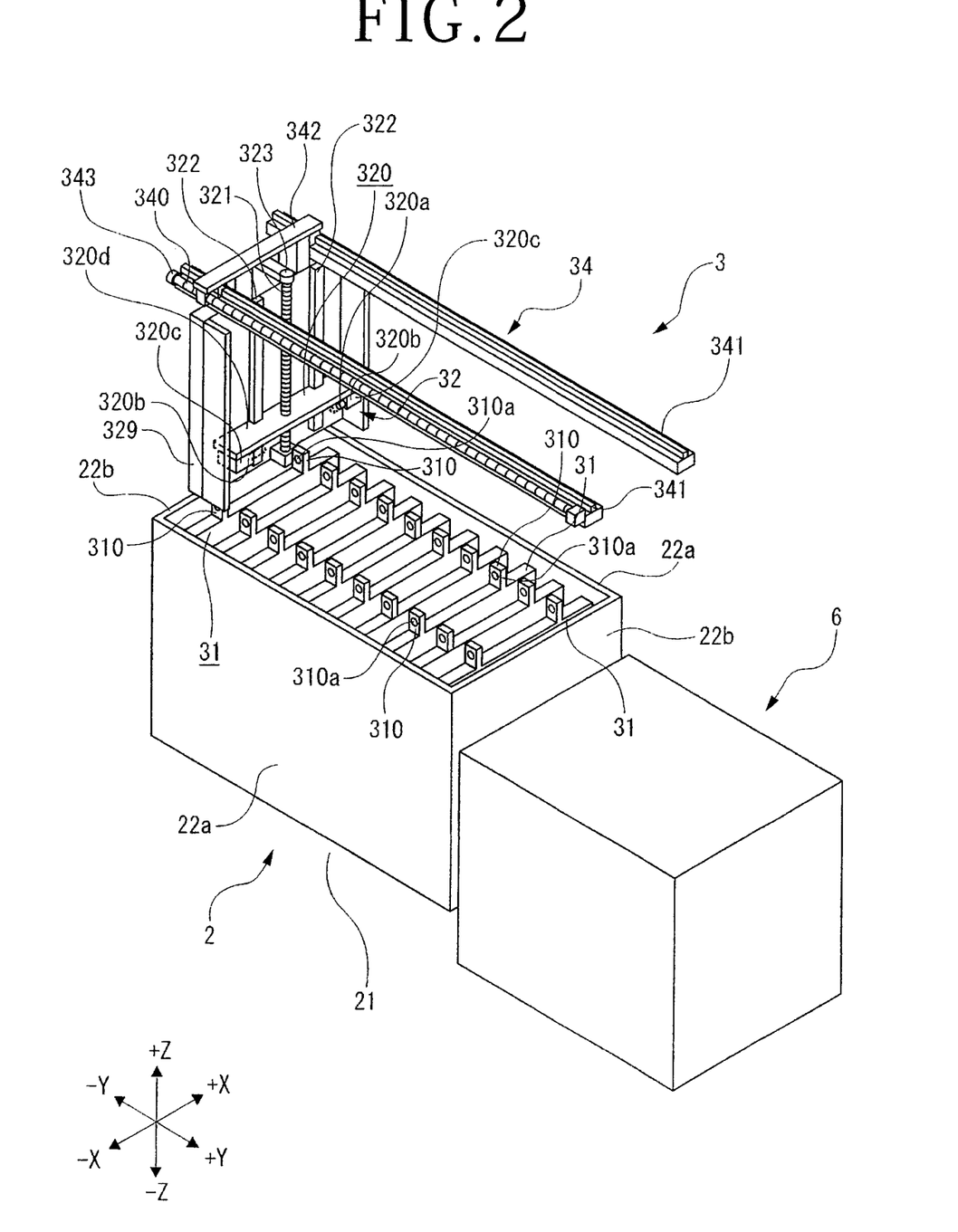
FIG. 2 is a perspective view depicting a waste fluid bath in which positive plates and negative plates are arranged and handling means for handling each positive plate.

The waste fluid bath 2 has an outside shape like a substantially rectangular prism and it is formed of, for example, an insulating material such as synthetic resin. The waste fluid bath 2 is composed of a bottom plate 21 having a rectangular shape as viewed in plan and four side walls rising from the outer edge of the bottom plate 21 in the +Z direction, thereby defining a space for storing the waste fluid L containing the powder P of the workpiece S. As depicted in FIGS. 1 and 2, these four side walls are a pair of side walls 22a opposed to each other in the X direction and a pair of side walls 22b opposed to each other in the Y direction. Further, an overflow pipe (not depicted) for preventing the overflow of the waste fluid L is provided at an upper portion of the waste fluid bath 2. This overflow pipe is connected to the tank 12, so that the waste fluid L before overflowing from the waste fluid bath 2 can be returned through the overflow pipe to the tank 12.

The extracting means 3 for extracting the sludge P having a high water content from the waste fluid L stored in the waste fluid bath 2 includes, for example, a plurality of negative plates 30 provided in the waste fluid bath 2 and adapted to be negatively charged (the negative plates 30 being not depicted in FIG. 2), a plurality of positive plates 31 opposed to the negative plates 30 and adapted to be positively charged to attract the sludge P having a high water content, each positive plate 31 being removable from the waste fluid bath 2, handling means 32 having a holding portion 320 for holding each positive plate 31, the holding portion 320 being vertically movable to take each positive plate 31 out of the waste fluid bath 2 or to put each positive plate 31 into the waste fluid bath 2, and scraping means 36 for scraping the sludge P off each positive plate 31 taken out of the waste fluid bath 2 by the handling means 32.

Each positive plate 31 is formed of an electrochemically noble material such as copper, silver, platinum, and gold. In this preferred embodiment, each positive plate 31 is formed of stainless steel (SUS). Each positive plate 31 is a rectangular flat plate member.

For example, a plurality of support grooves (not depicted) are formed on the inner surfaces of the two side walls 22a of the waste fluid bath 2, the two side walls 22a being opposed to each other in the X direction. The plural support grooves formed on each side wall 22a are spaced at given intervals in the Y direction. The plural positive plates 31 are loosely inserted in these plural support grooves and thereby arranged at given intervals in the Y direction in the waste fluid bath 2. That is, the plural positive plates 31 are arranged at given intervals in the Y direction in the condition where the both side surfaces of each positive plate 31 are perpendicular to the Y direction, i.e., parallel to the X direction. As depicted in FIG. 2, the X direction is defined as a lateral direction of the waste fluid bath 2, and the Y direction is defined as a longitudinal direction of the waste fluid bath 2. Two projections 310 are formed on the upper end surface of each positive plate 31 at a central portion so as to be spaced from each other in the X direction. Each projection 310 is a rectangular plate portion and has a central through hole 310a extending in the X direction. The through hole 310a of each projection 310 is adapted to engage a pin 320a included in the holding portion 320 of the handling means 32.

Each negative plate 30 is interposed between the adjacent positive plates 31. That is, each negative plate 30 is opposed in parallel to the adjacent positive plates 31 in the Y direction so as to be spaced a given distance therefrom. Thus, the plural negative plates 30 and the plural positive plates 31 are alternately arranged at given intervals in the Y direction.

Each negative plate 30 is supported by, for example, a frame 33a having a rectangular shape as viewed in side elevation (in the Y direction) as depicted in FIG. 1. The frame 33a has a given width in the Y direction. The frame 33a is provided with, for example, a pipe 33b for sending a clear water to a clear water storing tank (not depicted), the clear water being obtained by removing the sludge P from the waste fluid L and allowed to enter the inside space of the frame 33a. As depicted in FIG. 1, the frame 33a has a pair of rectangular openings on both sides, and a pair of negative plates 30 are mounted on the frame 33a so as to close the pair of rectangular openings. Accordingly, the pair of negative plates 30 supported to each frame 33a are spaced in parallel. Each frame 33a supporting the pair of negative plates 30 are interposed between the adjacent positive plates 31.

As similar to each positive plate 31, each negative plate 30 is formed of an electrochemically noble material such as copper, silver, platinum, and gold. In this preferred embodiment, each negative plate 30 is formed of SUS. Each negative plate 30 is a rectangular flat plate member. Each negative plate 30 is a mesh plate, which is adapted to be negatively charged and thereby to generate a repulsive force to the sludge P. Accordingly, the sludge P is not caught by the mesh of each negative plate 30. That is, when each negative plate 30 is negatively charged, only the clear water in the waste fluid L is allowed to pass through each negative plate 30. The sludge P is negatively charged, so that a repulsive force is generated between the sludge P and each negative plate 30 and the pass of the sludge P through each negative plate 30 is restricted. Accordingly, the clear water passed through each negative plate 30 is stored in the inside space defined by each frame 33a and the two negative plates 30 supported to each frame 33a. Further, since a repulsive force is generated between each negative plate 30 and the sludge P, the inside space of each frame 33a can be isolated from the waste fluid L containing the sludge P in the waste fluid bath 2. The shape etc., of each negative plate 30 is not limited in the present invention.

Further, a spacing having a predetermined amount is defined between the lower end of each frame 33a and the bottom plate 21 of the waste fluid bath 2, and a spacing having a predetermined amount is defined between the lower end of each positive plate 31 and the bottom plate 21 of the waste fluid bath 2. Accordingly, the waste fluid L supplied into the waste fluid bath 2 is allowed to pass through these spacings and allowed to rise in the space between the negative plate 30 and the positive plate 31 adjacent to each other.

Figure 3:
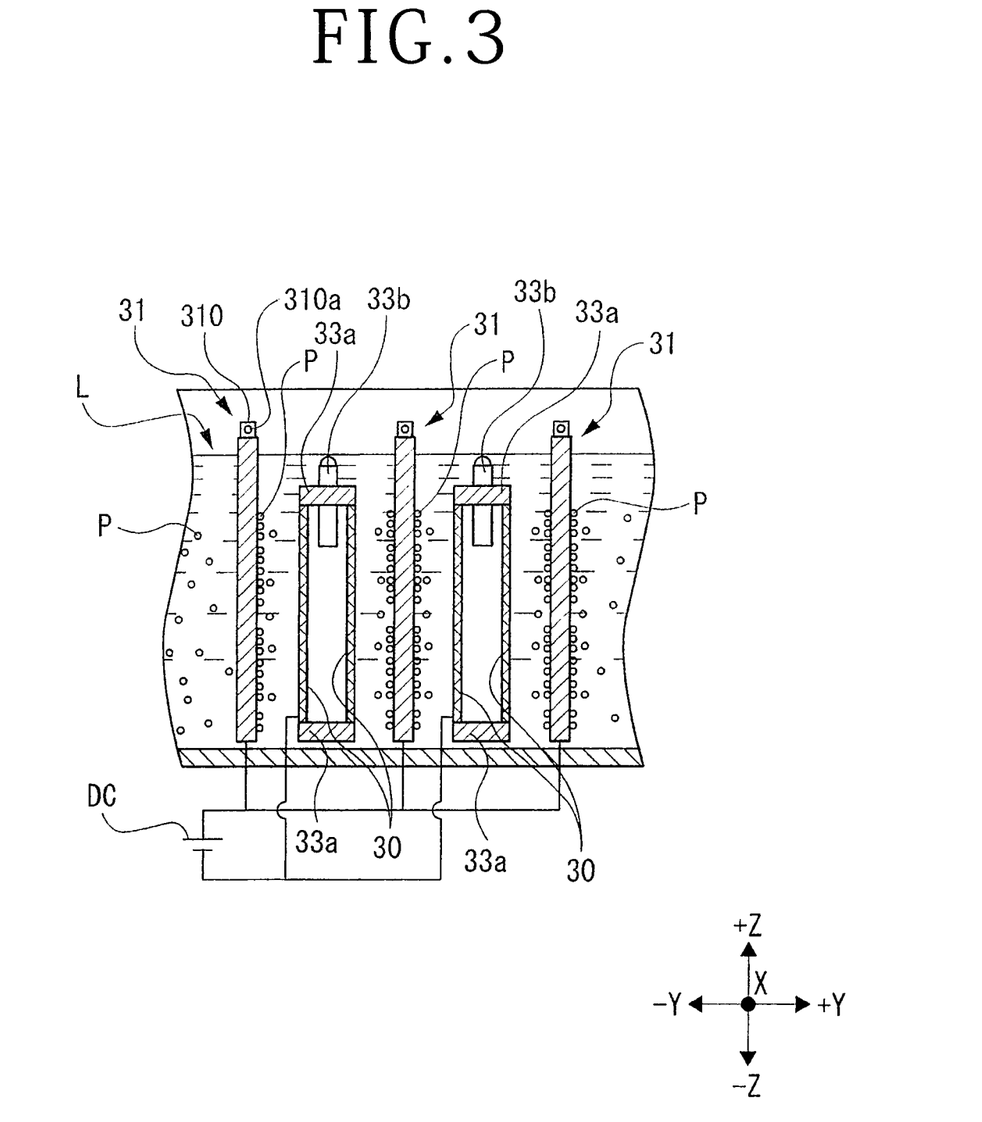
FIG. 3 is an enlarged sectional view depicting the arrangement of the positive plates and the negative plates in the waste fluid bath.

In this preferred embodiment, a direct-current voltage is applied between the positive plate 31 and the negative plate 30 adjacent to each other (see FIG. 3). That is, the positive electrode of a direct-current power supply DC is electrically connected to each positive plate 31, thereby positively charging each positive plate 31 in the waste fluid L. Accordingly, each positive plate 31 is positively charged in the waste fluid L to attract the sludge P negatively charged in the waste fluid L. On the other hand, the negative electrode of the direct-current power supply DC is electrically connected to each negative plate 30, thereby negatively charging each negative plate 30 in the waste fluid L. As a result, an electric field is formed between the positive plate 31 and the negative plate 30 opposed to each other. Accordingly, the sludge P negatively charged in the waste fluid L is moved away from the negative plate 30 negatively charged and moved toward the positive plate 31 positively charged due to electrophoresis.

Referring back to FIGS. 1 and 2, the handling means 32 for holding the upper portion of each positive plate 31 and taking each positive plate 31 out of the waste fluid bath 2 or putting each positive plate 31 into the waste fluid bath 2 is horizontally movable in the Y direction above the waste fluid bath 2 by Y moving means 34. As depicted in detail in FIG. 2, the Y moving means 34 includes a horizontal ball screw 340 extending parallel to the longitudinal direction (Y direction) of the waste fluid bath 2, a motor 343 for rotating the horizontal ball screw 340, a pair of horizontal guide rails 341 extending in the Y direction, and a movable member 342 having an internal nut threadedly engaged with the horizontal ball screw 340 and having a pair of guided portions formed on the lower surface and respectively slidably engaged with the pair of horizontal guide rails 341. Accordingly, when the motor 343 is operated to rotate the horizontal ball screw 340, the movable member 342 is moved in the Y direction along the horizontal guide rails 341. The movable member 342 is fixed to the handling means 32, so that the handling means 32 can be moved in the Y direction together with the movable member 342. The horizontal ball screw 340 and the horizontal guide rails 341 have substantially the same length covering the length of the waste fluid bath 2 in the Y direction plus the length of a front portion of the drying means 6 (in the −Y direction). Accordingly, when the handling means 32 is moved in the Y direction, the positive plate 31 held by the handling means 32 can be moved from the waste fluid bath 2 to the drying means 6.

The handling means 32 includes a vertical plate 329 having an upper end fixed to the movable member 342, a vertical ball screw 321 provided on one side of the vertical plate 329 (in the +Y direction) so as to extend parallel to the vertical direction (Z direction) of the waste fluid bath 2, a motor 323 for rotating the vertical ball screw 321, a pair of vertical guide rails 322 extending in the Z direction, and a holding portion 320 (movable member) having an internal nut threadedly engaged with the vertical ball screw 321 and having a pair of guided portions formed on one side surface (in the −Y direction) and respectively slidably engaged with the pair of vertical guide rails 322. Accordingly, when the motor 323 is operated to rotate the vertical ball screw 321, the holding portion 320 is moved in the Z direction along the vertical guide rails 322.

The holding portion 320 of the handling means 32 for holding each positive plate 31 includes, for example, a plate member 320d extending in the lateral direction of each positive plate 31 (i.e., in the X direction), the plate member 320d having an internal nut threadedly engaged with the vertical ball screw 321, and a pair of chuck cylinders 320c provided on the lower surface of the plate member 320d. The pair of chuck cylinders 320c are opposed to each other in the lateral direction of the waste fluid bath 2 (i.e., in the X direction) at a given interval. Each chuck cylinder 320c includes a cylinder body 320b mounted on the plate member 320d and the pin 320a adapted to retractably project from the cylinder body 320b in the lateral direction of the waste fluid bath 2 (i.e., in the X direction). The two pins 320a of the pair of chuck cylinders 320c are adapted to project from the respective cylinder bodies 320b toward each other in the X direction. When the holding portion 320 is lowered to a position above each positive plate 31 so that the two cylinder bodies 320b of the holding portion 320 are respectively opposed to the two projections 310 of each positive plate 31 in the X direction, the two pins 320a of the holding portion 320 are operated to project from the respective cylinder bodies 320b and come into engagement with the two through holes 310a of the respective projections 310 of each positive plate 31, respectively. Accordingly, each positive plate 31 is held by the holding portion 320 of the handling means 32.

Figure 4:
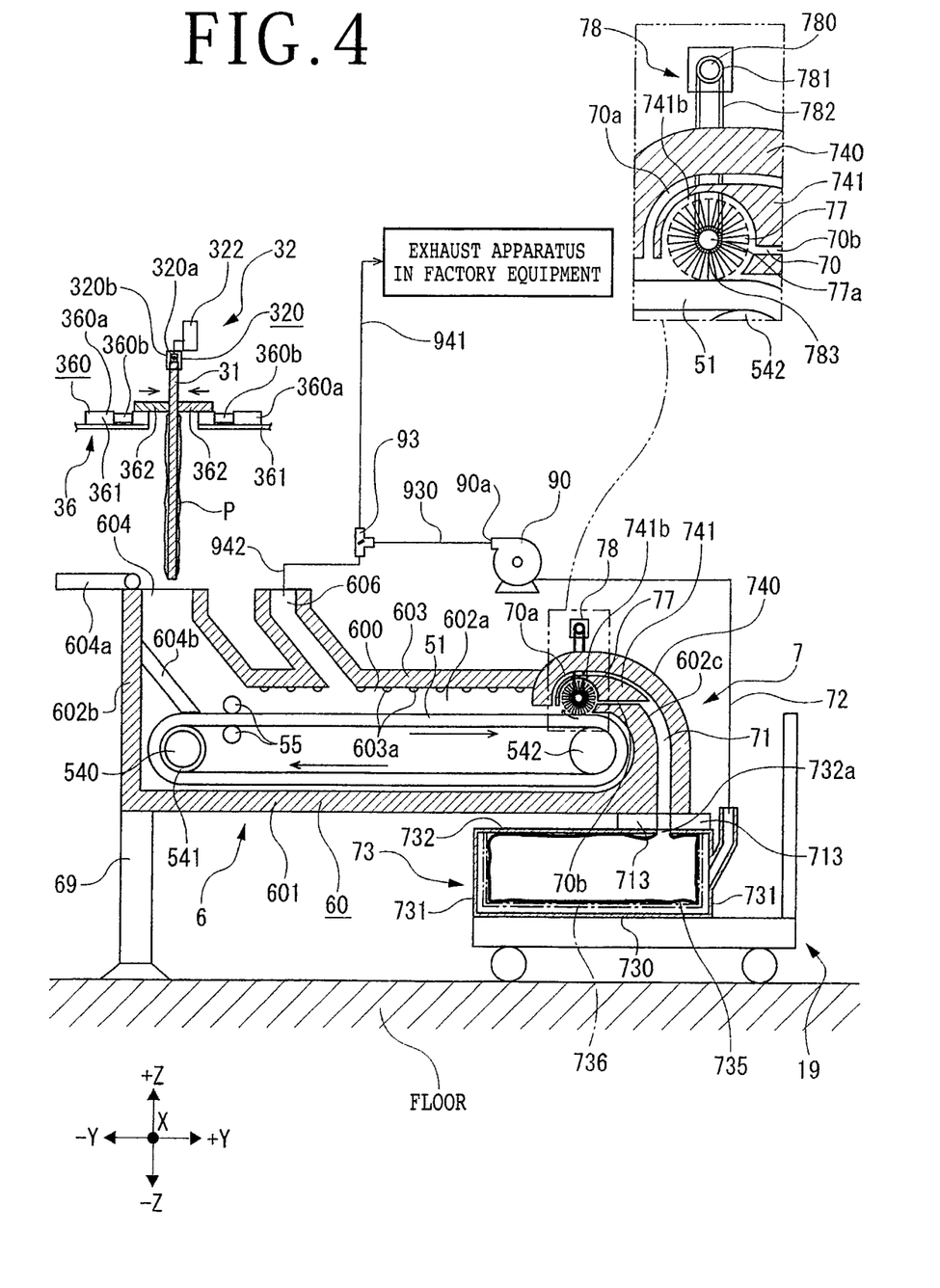
FIG. 4 is an enlarged sectional view depicting a condition that a sludge containing water is deposited to the positive plate held by the handling means and the sludge is to be dropped from the positive plate into a drying box.

The scraping means 36 for scraping the sludge P off each positive plate 31 taken out of the waste fluid bath 2 by the handling means 32 is depicted simply in FIG. 1 and depicted in detail in FIG. 4. As depicted in FIG. 4, the scraping means 36 is provided above a sludge inlet 604 of a drying box 60 included in the drying means 6. The sludge inlet 604 is formed at one end of the drying box 60 in the −Y direction. The scraping means 36 includes a pair of cylinders 360 (motor-driven cylinders or air cylinders), a pair of support plates 361 for supporting the pair of cylinders 360, respectively, and a pair of scraping plates 362 adapted to be moved in the Y direction by the pair of cylinders 360, respectively.

Each cylinder 360 includes a cylinder tube 360a incorporating a piston (not depicted) and a piston rod 360b partially inserted in the cylinder tube 360a and having one end fixed to the piston. Each scraping plate 362 is fixed to the other end of the piston rod 360b of the corresponding cylinder 360. The pair of scraping plates 362 are opposed to each other in the Y direction in such a manner that each positive plate 31 can be interposed between the ends of the pair of scraping plates 362. Each scraping plate 362 extends in the X direction and has a length slightly larger than the width of each positive plate 31 (the length in the X direction).

With this configuration, the opposite side surfaces of each positive plate 31 can be pinched by the pair of scraping plates 362 of the scraping means 36. In the condition where the opposite side surfaces of each positive plate 31 are pinched by the pair of scraping plates 362, the holding portion 320 of the handling means 32 holding each positive plate 31 is raised, for example. As a result, the sludge P having a high water content can be scraped off the opposite side surfaces of each positive plate 31 by the pair of scraping plates 362.

For example, the drying means 6 for removing the water content from the sludge P is provided adjacent to the waste fluid bath 2. The sludge P having a high water content as extracted from the waste fluid L by the extracting means 3 is dried on the transfer belt 51 as depicted in FIG. 4 and transferred to the recovering means 7. The transfer belt 51 is provided in the drying box 60 of the drying means 6 so as to extend in the Y direction.

The drying means 6 for drying the sludge P to be transferred by the transfer belt 51 includes the drying box 60 configured so as to cover at least the upper surface of the transfer belt 51 and extend in the direction (Y direction) of extension of the transfer belt 51, the sludge inlet 604 formed at one end of the drying box 60 in the −Y direction for introducing the sludge P onto the transfer belt 51, an air outlet 70 formed at the other end of the drying box 60 in the +Y direction for discharging air in the drying box 60, a blower fan 90 provided outside the drying box 60 for sucking the air in the drying box 60 from the air outlet 70 and thereby returning the exhaust air into the drying box 60, and a return inlet 606 formed near the sludge inlet 604 for returning the exhaust air sucked by the blower fan 90 into the drying box 60.

The drying box 60 has an outside shape like a substantially rectangular prism as viewed in plan. That is, the drying box 60 is composed of a rectangular bottom plate 601, four side walls rising from the outer edge of the bottom plate 601 in the +Z direction, and a top plate 603 connected to the upper ends of the four side walls and opposed to the upper surface of the transfer belt 51. These four side walls are a pair of side walls 602a opposed to each other in the X direction (one of the side walls 602a on the back side of the sheet plane of FIG. 4 being depicted) and a pair of side walls 602b and 602c opposed to each other in the Y direction. The inside space of the drying box 60 includes an air passage 600 for passing the air in the transfer direction where the sludge P is transferred by the transfer belt 51. That is, the air passage 600 is formed above the transfer belt 51 in the inside space of the drying box 60.

The sludge inlet 604 is formed through the thickness of the top plate 603 at one end thereof in the −Y direction. The sludge inlet 604 serves as an inlet for introducing the sludge P scraped off each positive plate 31 and dropped toward the upper surface of the transfer belt 51. Thus, the sludge P having a high water content is dropped through the sludge inlet 604 into the drying box 60. The sludge inlet 604 is provided with a lid 604a as depicted in FIG. 4. The lid 604a is hinged to the top plate 603, thereby opening and closing the sludge inlet 604. A guide plate 604b is provided below the sludge inlet 604, for example. The guide plate 604b is inclined so as to guide the sludge P dropped through the sludge inlet 604 to the upper surface of the transfer belt 51. In this preferred embodiment, the sludge inlet 604 serves also as an air inlet for introducing the outside air into the drying box 60 at one end thereof (in the −Y direction).

A plurality of projections 603a for generating turbulence may be formed on the lower surface of the top plate 603. In this preferred embodiment, each projection 603a has a semispherical outside shape as depicted in FIG. 4. As a modification, each projection 603a may have a cylindrical or prismatic outside shape. While the plural projections 603a are arranged at equal intervals both in the X direction and in the Y direction in this preferred embodiment, the plural projections 603a may be arranged in a random fashion. Further, in the case that each projection 603a has a cylindrical or prismatic outside shape, the plural projections 603a may be arranged at equal intervals in the Y direction in the condition where the axis of each projection 603a extends in the X direction.

Owing to the presence of the projections 603a, the gas (air) flowing in the air passage 600 in the drying box 60 strikes the projections 603a formed on the lower surface of the top plate 603 of the drying box 60, thereby producing turbulence. That is, an irregular vortex of the gas is produced above the transfer belt 51 by the plural projections 603a, and the gas in this condition flows in the transfer direction. As a result, the turbulent flow of the gas is blown against the sludge P having a high water content being transferred on the upper surface of the transfer belt 51, thereby facilitating the vaporization of water from the sludge P. However, the formation of the plural projections 603a on the lower surface of the top plate 603 is not essential.

The transfer belt 51 is an endless belt and it is rotatably driven by a motor 540, for example. The motor 540 is fixed to one of the pair of side walls 602a. A drive roller 541 is mounted on the output shaft of the motor 540, and the transfer belt 51 is wrapped on the drive roller 541. The front end of the output shaft of the motor 540 is supported to the other side wall 602a. A driven roller 542 is rotatably mounted on the side walls 602a at a position spaced a given distance from the motor 540 in the +Y direction. The transfer belt 51 is also wrapped on the driven roller 542. Accordingly, when the motor 540 is operated to rotate the drive roller 541, the transfer belt 51 is moved to rotate the driven roller 542.

The drying means 6 further includes thickness adjusting means 55 for spreading the sludge P placed on the transfer belt 51 in concert with the movement of the transfer belt 51, thereby flattening the sludge P into a plate like material having a given thickness. In this preferred embodiment, the thickness adjusting means 55 is configured by a pair of pinch rollers provided in the vicinity of the position where the sludge P is dropped onto the transfer belt 51. The pair of pinch rollers are opposed to each other in the Z direction so as to interpose the transfer belt 51 therebetween. The pair of pinch rollers are adapted to be rotated by a frictional force received from the transfer belt 51. Both ends of each pinch roller are rotatably supported to the side walls 602a. Each pinch roller extends in the X direction and has a length greater than or equal to the width of the transfer belt 51, for example. As a modification, the thickness adjusting means 55 may be configured by a squeegee or the like.

The recovering means 7 essentially includes a roll brush 77 provided adjacent to the air outlet 70 so as to horizontally extend in the direction (X direction) perpendicular to the direction (Y direction) of extension of the transfer belt 51, rotating means 78 for rotating the roll brush 77 in the condition where the bristle ends of the roll brush 77 are in contact with the upper surface of the transfer belt 51, a recovery box 73 for recovering the sludge P dried on the transfer belt 51 by the drying means 6 and separated from the transfer belt 51 by the roll brush 77, a first communication passage 71 for making the communication between the air outlet 70 and the recovery box 73, and a second communication passage 72 for making the communication between the recovery box 73 and the blower fan 90.

The side wall 602c of the drying box 60 at the other end thereof (in the +Y direction) has a flat upper end extending substantially horizontally in the −Y direction.

The recovering means 7 includes, for example, an outer wall 740 and an inner wall 741. The outer wall 740 has a round upper portion above the side wall 602c of the drying box 60 and is connected to the top plate 603 of the drying box 60 and to the two side walls 602a opposed to each other in the X direction. The inner wall 741 is connected to the two side walls 602a and located below the outer wall 740. A part of the lower surface of the inner wall 741 is opposed to the upper end surface of the side wall 602c of the drying box 60.

The lower surface of the inner wall 741 is cut out so as to form a substantially semicylindrical hollow portion 741b extending in the X direction. The roll brush 77 is accommodated in the hollow portion 741b of the inner wall 741. A space is defined between the round lower surface of the upper portion of the outer wall 740 and the round upper surface of the inner wall 741 to thereby form a first air outlet 70a constituting the air outlet 70.

Further, a space is defined between the flat lower surface of the inner wall 741 and the flat upper end surface of the side wall 602c of the drying box 60 to thereby form a second air outlet 70b constituting the air outlet 70. The first air outlet 70a has, for example, a sectional area larger than that of the second air outlet 70b. As depicted in FIG. 4, the first air outlet 70a and the second air outlet 70b are joined to each other at the upper end of the first communication passage 71 formed between the outer surface of the side wall 602c of the drying box 60 and the inner surface of the outer wall 740. Thus, both the first air outlet 70a and the second air outlet 70b are in communication with the recovery box 73 through the first communication passage 71. As a modification, the air outlet 70 may be composed solely of the second air outlet 70b. The lower end of the first communication passage 71 opens, for example, adjacent to the bottom plate 601 of the drying box 60 at the rear end thereof in the +Y direction.

The first air outlet 70a functions to introduce a relatively large-sized part of the sludge P dried on the transfer belt 51, and the second air outlet 70b functions to introduce the other part of the sludge P as forcibly separated from the transfer belt 51 by the roll brush 77.

As depicted in FIG. 4, a plurality of legs 69 such as jack bases are provided on the lower surface of the bottom plate 601 of the drying box 60. The legs 69 of the drying box 60 are set on the floor of a processing room such as a clean room where the grinding apparatus 4 and the sludge drying apparatus 1 are installed. Accordingly, a given space is defined between the bottom plate 601 of the drying box 60 and the floor of the processing room, and the recovery box 73 is set in this given space.

The recovery box 73 has, for example, an outside shape like a substantially rectangular prism. That is, the recovery box 73 is composed of a bottom plate 730, four side walls 731 rising from the outer edge of the bottom plate 730 in the +Z direction, and a top plate 732 connected to the upper end of each side wall 731. Accordingly, a closed space is defined by the bottom plate 730, the side walls 731, and the top plate 732, so as to store the sludge P dried. The top plate 732 has a through hole 732a as a sludge inlet.

A recovery bag 735 and a mesh plate 736 are provided inside the recovery box 73 in such a manner that the mesh plate 736 is interposed between the recovery bag 735 and the recovery box 73. The recovery bag 735 is a replaceable member in which the sludge P comes into direct contact. That is, the recovery bag 735 functions to prevent that the sludge P may adhere to the inner surface of the recovery box 73. The mesh plate 736 functions to define a space for passing air between the recovery bag 735 and the inner surface of the recovery box 73.

The mesh plate 736 disposed outside the recovery bag 735 may be configured by a wire net or a punched plate formed by punching a metal plate or a resin plate to form a plurality of fine holes. The mesh plate 736 forms a box inside the recovery box 73 so as to define a space between the mesh plate 736 and the bottom plate 730 and between the mesh plate 736 and the side walls 731.

The replaceable recovery bag 735 set inside the mesh plate 736 is formed of, for example, a dry or wet nonwoven fabric capable of recovering the sludge P dried and passing air. The sludge P dried is introduced from the sludge inlet 732a into the recovery bag 735.

As depicted in FIG. 4, the recovery box 73 may be adapted to be movably set below the drying box 60 in the condition where the recovery box 73 is placed on a cart 19 with casters. For example, the cart 19 is moved by an operator so as to be set at any mark indicating a cart setting position as formed on the floor surface in the processing room. In this set condition of the cart 19, the sludge inlet 732a of the recovery box 73 can be brought into communication with the lower end of the first communication passage 71.

A joint member 713 having a communication hole may be provided around the lower end of the first communication passage 71 so as to make the communication between the sludge inlet 732a of the recovery box 73 and the lower end of the first communication passage 71 without the leak of the sludge P. That is, the lower end of the first communication passage 71 communicates with the sludge inlet 732a through the communication hole of the joint member 713. For example, the joint member 713 may be configured by a bellows tube or a drain hose fixed to the lower surface of the bottom plate 601 and having a joint connectable to the sludge inlet 732a.

The roll brush 77 has an outside shape like a substantially cylinder. For example, the roll brush 77 has bristles formed from elastic resin fiber such as nylon. The roll brush 77 includes a brush shaft 77a extending in the X direction, and the bristles are implanted in the outer circumferential surface of the brush shaft 77a so as to project radially outward therefrom.

As enlargedly depicted in a part of FIG. 4, the rotating means 78 for rotating the roll brush 77 is a pully mechanism including a motor 780 as a drive source for rotating the roll brush 77 about the axis of the brush shaft 77a. A drive pulley 781 is mounted on the output shaft of the motor 780, and an endless belt 782 is wrapped on the drive pulley 781. A driven pulley 783 is mounted on the brush shaft 77a, and the endless belt 782 is also wrapped on the driven pulley 783. Accordingly, when the motor 780 is operated to rotate the drive pulley 781, the endless belt 782 is moved to thereby rotate the driven pulley 783, so that the roll brush 77 is rotated about the axis of the brush shaft 77a extending in the X direction. The outer wall 740 and the inner wall 741 of the recovering means 7 have through holes allowing the pass of the endless belt 782, in which each through hole is provided with a sealing member (not depicted). That is, the endless belt 782 is movably inserted through these through holes with the sealing members.

The second communication passage 72 may be configured by a metal pipe or a flexible resin pipe. One end of the second communication passage 72 is connected to one of the four side walls 731 of the recovery box 73 as depicted in FIG. 4. The other end of the second communication passage 72 is connected to an intake port (not depicted) of the blower fan 90. A pipe 930 is connected at one end thereof to a discharge port 90a of the blower fan 90. A dividing portion 93 is connected to the other end of the pipe 930. The dividing portion 93 functions to divide the flow rate of the exhaust gas discharged from the blower fan 90 into two parts. For example, the dividing portion 93 is realized by a three-way valve capable of controlling the flow rate of the exhaust gas to be divided into a discharge pipe 941 and a return pipe 942. As a modification, the dividing portion 93 may be composed of a dividing pipe and a control valve capable of controlling the flow rate of the exhaust gas flowing in one of the discharge pipe 941 and the return pipe 942. As another modification, the flow rate of the exhaust gas may be divided according to the diameters of the discharge pipe 941 and the return pipe 942.

Thus, one end of the discharge pipe 941 and one end of the return pipe 942 are connected to the dividing portion 93. The other end of the discharge pipe 941 is connected to an exhaust apparatus having suction means in factory equipment. The return pipe 942 functions to return a part of the exhaust gas divided by the dividing portion 93 to the drying box 60. The other end of the return pipe 942 is connected to the return inlet 606. The return inlet 606 is formed through the thickness of the top plate 603 at a position in the vicinity of the sludge inlet 604 of the top plate 603.

The operation of the sludge drying apparatus 1 will now be described in the case that the workpiece S depicted in FIG. 1 is ground by the abrasive members 404b in the condition where a grinding water is supplied to the workpiece S and that the sludge P having a high water content is recovered from the waste fluid L containing the powder P of the workpiece S ground by the abrasive members 404b, in which the sludge P recovered is next dried by the drying means 6.

The workpiece S is first held on the holding surface 41a of the holding table 41 under suction. Thereafter, the table support 42 is moved to set the holding table 41 holding the workpiece S at the grinding position where the workpiece S is opposed to the abrasive members 404b. The motor 402 is next operated to rotate the spindle 400 about its vertical axis extending in the Z direction, thereby rotating the grinding wheel 404. Thereafter, the grinding means 40 is lowered until the abrasive members 404b come into contact with the upper surface of the workpiece S held on the holding table 41. At this time, the holding table 41 is also rotated at a predetermined speed to thereby rotate the workpiece S held on the holding surface 41a. Accordingly, the upper surface of the workpiece S is entirely ground by the abrasive members 404b. During this grinding operation, a grinding water is supplied to the position where the abrasive members 404b come into contact with the upper surface of the workpiece S, thereby cooling and cleaning the contact position.

In this manner, the workpiece S is ground to cause the generation of fine powder P from the workpiece S. The fine powder P is mixed in the grinding water to produce the waste fluid L. The waste fluid L thus produced is allowed to flow through the opening 49a into the water case 48. Thereafter, the waste fluid L is sent through the drain pipe 485a to the tank 12 and then further sent through the delivery pipe 121a to the waste fluid bath 2. The waste fluid L is now stored in the waste fluid bath 2. The powder P of the workpiece S absorbs the grinding water to become the sludge P having a high water content.

In the condition where the waste fluid L is stored in the waste fluid bath 2, the positive plates 31 and the negative plates 30 are immersed into the waste fluid L as depicted in FIG. 3. Thereafter, the positive electrode of the direct-current power supply DC is connected to the positive plates 31, and the negative electrode of the direct-current power supply DC is connected to the negative plates 30 to thereby positively charge the positive plates 31 and negatively charge the negative plates 30. As a result, an electric field is formed between the positive plate 31 and the negative plate 30 adjacent to each other. Accordingly, owing to electrophoresis, the sludge P mixed in the waste fluid L and negatively charged receives a repulsive force from the negative plates 30 negatively charged and an attractive force from the positive plates 31 positively charged. Thus, the sludge P in the waste fluid L is deposited to the positive plates 31, so that the waste fluid L in the space defined by each frame 33a and the corresponding negative plates 30 becomes a clear water almost free of the sludge P. The clear water is next sent through the pipe 33b depicted in FIG. 3 to the clear water storing tank (not depicted).

After a given amount of sludge P is deposited to the positive plates 31, the Y moving means 34 depicted in FIG. 1 is operated to move the holding portion 320 of the handling means 32 to the position just above one of the positive plates 31. Thereafter, the holding portion 320 is lowered to hold the positive plate 31 and then raised to take the positive plate 31 out of the waste fluid L stored in the waste fluid bath 2. Thereafter, the Y moving means 34 is operated to move the holding portion 320 holding the positive plate 31 to the position just above the sludge inlet 604 of the drying box 60 as depicted in FIG. 4.

Figure 5:
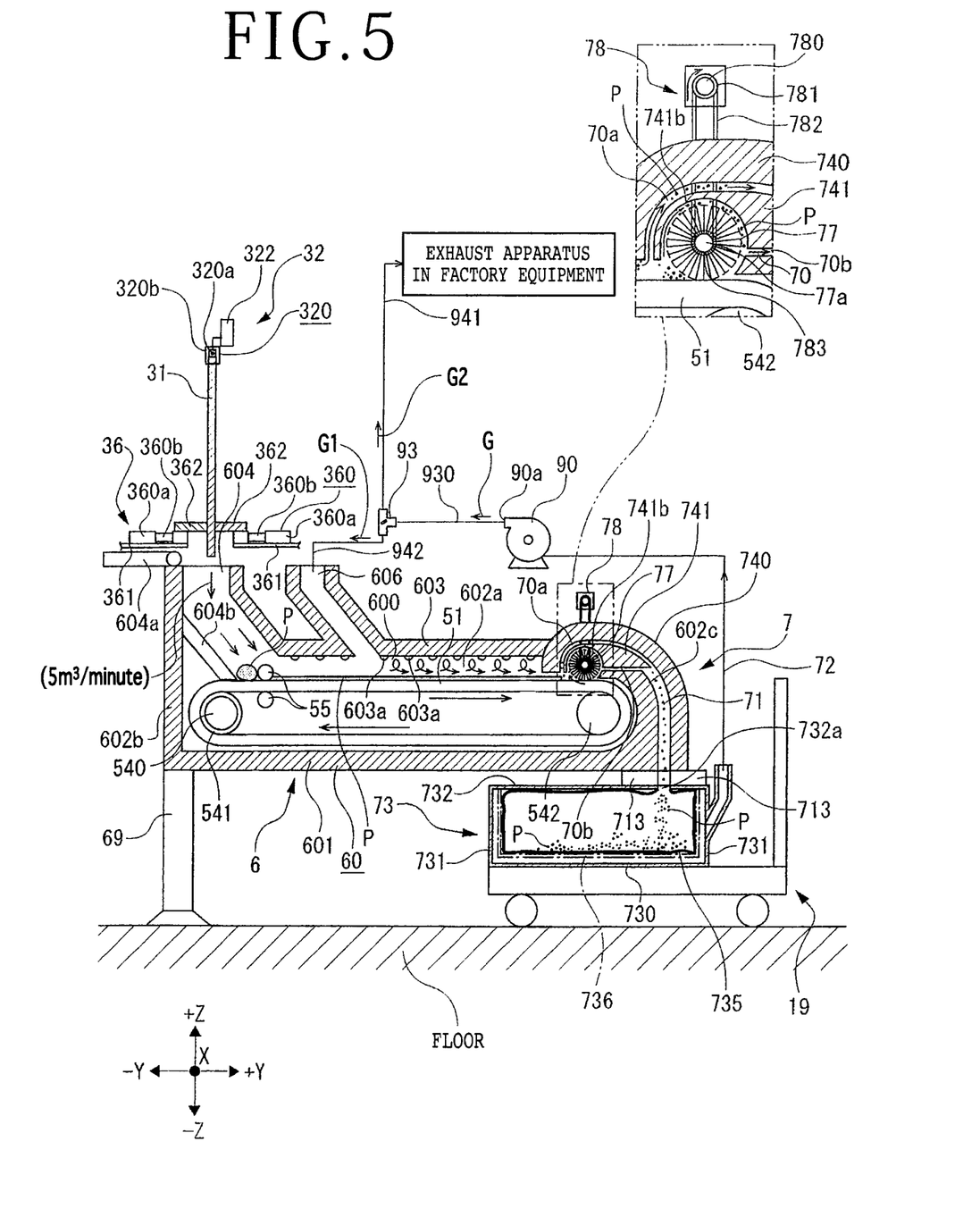
FIG. 5 is a view similar to FIG. 4, depicting a condition that the sludge dried is separated from a transfer belt by using a roll brush, and the sludge separated is next recovered into a recovery box by using a suction force produced by a blower fan.

Thereafter, the pair of cylinders 360 of the scraping means 36 are operated to horizontally move the pair of scraping plates 362 toward each other, thereby pinching the positive plate 31 between the pair of scraping plates 362 as depicted in FIG. 4. Thereafter, the motor 323 (see FIG. 2) is operated to raise the holding portion 320, thereby raising the positive plate 31. As a result, the sludge P having a high water content is scraped off the positive plate 31 by the pair of scraping plates 362. Accordingly, as depicted in FIG. 5, the sludge P is dropped in the form of a lump from the positive plate 31 through the sludge inlet 604 of the drying box 60 onto the guide plate 604b provided in the drying box 60. The lump of the sludge P is moved to the upper surface of the transfer belt 51 due to the inclination of the guide plate 604b. At this time, the lid 604d is previously opened.

Thereafter, the motor 540 is operated to rotate the drive roller 541, thereby rotating the transfer belt 51 and the driven roller 542. As a result, the sludge P is transferred in the +Y direction by the transfer belt 51. At this time, the lump of the sludge P is passed through the spacing between an upper roller of the thickness adjusting means 55 and the transfer belt 51, so that the lump of the sludge P is spread on the transfer belt 51 to become a platelike material having a given thickness (e.g., very small value) as depicted in FIG. 5. More specifically, the thickness adjusting means 55 is configured by a pair of pinch rollers provided so as to pinch the transfer belt 51 in a vertical direction, so that the lump of the sludge P placed on the transfer belt 51 is pressed by the upper roller of the pair of pinch rollers as the thickness adjusting means 55 in passing between the upper roller and the transfer belt 51. Accordingly, the lump of the sludge P is spread to become a platelike material having a given small thickness.

During the transfer of the sludge P having a high water content by the transfer belt 51, the blower fan 90 provided outside the drying box 60 is operated to suck the air (gas) in the drying box 60 from the air outlet 70. Accordingly, the outside air is taken from the sludge inlet 604 that functions also as an air inlet into the drying box 60. The outside air taken into the drying box 60 is allowed to flow in the air passage 600 in the transfer direction (+Y direction). As a result, the water contained in the sludge P on the transfer belt 51 is vaporized, so that the sludge P is dried. More specifically, when the blower fan 90 is operated, a suction force is produced and it is transmitted from the second communication passage 72, the recovery box 73, the first communication passage 71, and the air outlet 70 (i.e., the first air outlet 70a and the second air outlet 70b) to the air passage 600 in the drying box 60. Accordingly, the air in the drying box 60 is sucked by the blower fan 90.

In this preferred embodiment, the air flowing in the air passage 600 of the drying box 60 in the transfer direction collides with the projections 603a formed on the lower surface of the top plate 603 of the drying box 60 to thereby produce turbulence. That is, an irregular vortex of air is produced above the transfer belt 51 due to the presence of the projections 603a, and this vortex flows in the transfer direction. As a result, the turbulent flow of the air strikes the upper surface of the sludge P spread on the upper surface of the transfer belt 51, so that the vaporization of the water contained in the sludge P can be facilitated to thereby promote the drying of the sludge P.

As depicted in FIG. 5, the flow rate of the air to be discharged from the blower fan 90 is set to 10 $m^3$/min, for example. An exhaust gas G discharged from the discharge port 90a of the blower fan 90 to the pipe 930 is divided into an exhaust gas G1 (e.g., flow rate of 5 $m^3$/min) and an exhaust gas G2 (e.g., flow rate of 5 m³/min) by the dividing portion 93, in which the exhaust gas G1 is returned to the drying box 60, and the exhaust gas G2 is sent to the exhaust apparatus in the factory equipment. The exhaust gas G absorbs heat generated from a motor (not depicted) in the blower fan 90, so that the temperature of the exhaust gas G rises by 5 to 6 degrees from the temperature of the intake air. Accordingly, the temperature of the exhaust gas G1 is higher by 5 to 6 degrees than the temperature of the outside air taken from the sludge inlet 604 into the drying box 60. The exhaust gas G1 is returned through the return pipe 942 and the return inlet 606 into the drying box 60. The ratio between the flow rate of the exhaust gas G1 and the flow rate of the exhaust gas G2 is not limited to 1:1.

In this manner, the exhaust gas G1 as a part of the exhaust gas G divided by the dividing portion 93 is returned from the return inlet 606 into the drying box 60, and the air in the drying box 60 continues to be sucked from the air outlet 70 by the blower fan 90. To maintain the air pressure in the drying box 60 at a constant level, the outside air is taken from the sludge inlet 604 into the drying box 60 by the same amount (e.g., flow rate of 5 m³/min) as the flow rate of the exhaust gas G2 as the other part of the exhaust gas G divided by the dividing portion 93. Thereafter, the exhaust gas G1 returned from the return inlet 606 and the outside air taken from the sludge inlet 604 are mixed in the drying box 60 and the mixture gas obtained is allowed to flow in the air passage 600 in the transfer direction (+Y direction). Thus, the water contained in the sludge P on the transfer belt 51 is vaporized by the flow of this mixture gas, so that the sludge P is dried. In this manner, by operating the blower fan 90 provided outside the drying box 60, the air in the drying box 60 is sucked through the first air outlet 70a and the second air outlet 70b and then returned into the drying box 60 from the return inlet 606 formed near the sludge inlet 604.

In this manner, the water contained in the sludge P is removed in the drying box 60. Accordingly, the sludge P on the transfer belt 51 is almost dried near the recovering means 7. In the recovering means 7, the sludge P dried is recovered. More specifically, the rotating means 78 is operated to rotate the roll brush 77 about its axis extending in the X direction at a predetermined speed.

The sludge P dried on the transfer belt 51 is first sucked from the first air outlet 70a toward the first communication passage 71. At this time, the sludge P to be sucked from the first air outlet 70a has a relatively large size such that the sludge P can be removed from the transfer belt 51 without using the roll brush 77.

The sludge P not sucked from the first air outlet 70a is further transferred toward the roll brush 77 by the transfer belt 51. The roll brush 77 is rotated in such a manner that the bristle ends of the roll brush 77 come into contact with the upper surface of the transfer belt 51, so that the sludge P left on the transfer belt 51 is scrubbed away by the bristle ends of the roll brush 77 and thereby powdered to rise into the air in the drying box 60. Accordingly, the sludge P thus powdered is sucked into the second air outlet 70b.

The sludge P sucked from the first air outlet 70a or the second air outlet 70b is allowed to flow in the first communication passage 71 and next enter the recovery bag 735 set in the recovery box 73 from the sludge inlet 732a. When the sludge P dried is stored by a predetermined amount in the recovery bag 735, the cart 19 is drawn from the set position below the drying box 60 by the operator to thereby move the recovery box 73 away from the drying box 60, so that the recovery bag 735 storing the predetermined amount of sludge P dried can be recovered.

Another cart 19 on which another recovery box 73 having an empty recovery bag 735 is previously set is prepared adjacent to the previous cart 19. The next cart 19 is moved to the set position below the drying box 60 by the operator in such a manner that the sludge inlet 732a of the recovery box 73 set on the next cart 19 comes into communication with the lower end of the first communication passage 71. Accordingly, the sludge P dried can be continuously recovered without almost stopping the operation of the sludge drying apparatus 1.

As described above, the sludge drying apparatus 1 according to the present invention includes the waste fluid bath 2, the extracting means 3 for extracting the sludge P from the waste fluid L stored in the waste fluid bath 2, the transfer belt 51 for transferring the sludge P extracted by the extracting means 3, the drying means 6 for drying the sludge P to be transferred by the transfer belt 51, and the recovering means 7 for recovering the sludge P transferred by the transfer belt 51 and dried by the drying means 6, in which the drying means 6 includes the drying box 60 configured so as to cover at least the upper surface of the transfer belt 51 and extend in the direction of extension of the transfer belt 51, the sludge inlet 604 formed at one end of the drying box 60 in the −Y direction for introducing the sludge P onto the transfer belt 51, the first and second air outlets 70a and 70b formed at the other end of the drying box 60 in the +Y direction, the blower fan 90 provided outside the drying box 60 for sucking the air in the drying box 60 from the first and second air outlets 70a and 70b and thereby returning the exhaust air into the drying box 60, and the return inlet 606 formed near the sludge inlet 604 for returning the exhaust air sucked by the blower fan 90 into the drying box 60.

The recovering means 7 includes the roll brush 77 provided adjacent to the first and second air outlets 70a and 70b so as to horizontally extend in the direction perpendicular to the direction of extension of the transfer belt 51, the rotating means 78 for rotating the roll brush 77 in the condition where the bristle ends of the roll brush 77 are in contact with the upper surface of the transfer belt 51, the recovery box 73 for recovering the sludge P dried on the transfer belt 51 by the drying means 6 and separated from the transfer belt 51 by the roll brush 77, the first communication passage 71 for making the communication between the first and second air outlets 70a and 70b and the recovery box 73, and the second communication passage 72 for making the communication between the recovery box 73 and the blower fan 90. With this configuration, the sludge P dried can be separated from the transfer belt 51 by the roll brush 77, thereby obtaining the powder of the sludge P. The powder of the sludge P can be sucked by the blower fan 90 and then recovered into the recovery box 73. Accordingly, there is no possibility that the sludge P dried may fly in the air in the drying box 60 for a long period of time, thereby preventing contamination of the inside of the drying box 60. Further, since the sludge P is dried without using a heater, power consumption in the sludge drying apparatus 1 can be suppressed and the sludge P having a low melting point can be dried without being melted on the transfer belt 51 by the heat from the heater. Further, in the case of replacing the transfer belt 51 or cleaning the inside of the drying box 60, the operator is not required to wait until the heater is cooled.

The sludge drying apparatus 1 according to the present invention further includes the air inlet (the sludge inlet 604) formed at one end of the drying box 60 in the −Y direction for introducing the outside air into the drying box 60 and the dividing portion 93 for dividing the flow rate of the exhaust gas sucked from the first and second air outlets 70a and 70b through the recovery box 73 by the blower fan 90, into two parts. Accordingly, a part of the exhaust gas divided by the dividing portion 93 can be returned into the drying box 60 from the return inlet 606, so that the sludge P being transferred by the transfer belt 51 can be efficiently dried. Further, in drying the sludge P, hydrogen is generated in the drying box 60 due to the contact of the air and the sludge P. However, unlike the case of heater drying, the hydrogen generated is not accumulated in the drying box 60. That is, an increase in concentration of the hydrogen in the drying box 60 can be suppressed to thereby prevent hydrogen explosion. Further, the amount of exhaust gas to be sent to the exhaust apparatus in the factory equipment can also be reduced by the dividing portion 93 to thereby reduce a load on the exhaust apparatus in the factory equipment.

The present invention is not limited to the sludge drying apparatus 1 according to the above preferred embodiment, and various modifications may be made without departing from the scope of the present invention. Further, the components of the sludge drying apparatus 1 and the grinding apparatus 4 depicted in the attached drawings are not limited in shape etc., and various modifications may be made within the scope where the effect of the present invention can be exhibited.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A sludge drying apparatus for recovering a sludge having a high water content from a waste fluid and then drying the sludge, the waste fluid containing powder of a workpiece ground by abrasive members in a condition where a grinding water is supplied to the workpiece, the sludge drying apparatus comprising:
   a waste fluid bath for storing the waste fluid;
   extracting means for extracting the sludge from the waste fluid stored in the waste fluid bath;
   a transfer belt for transferring the sludge extracted by the extracting means;
   drying means for drying the sludge to be transferred by the transfer belt; and
   recovering means for recovering the sludge transferred by the transfer belt and dried by the drying means, wherein the drying means includes:
      a drying box configured so as to cover at least an upper surface of the transfer belt and extend in a direction of extension of the transfer belt,
      a sludge inlet formed at one end of the drying box in a direction of extension thereof for introducing the sludge onto the transfer belt,
      a first air outlet and second air outlet formed at the other end of the drying box in the direction of extension thereof for discharging air in the drying box,
      a blower fan provided outside the drying box for sucking the air in the drying box from the air outlet and thereby returning the exhaust air into the drying box, and
      a return inlet for returning the exhaust air sucked by the blower fan into the drying box, and
   the recovering means includes:
      a roll brush provided adjacent to the first air outlet so as to horizontally extend in a direction perpendicular to the direction of extension of the transfer belt,
      rotating means for rotating the roll brush in a condition where bristle ends of the roll brush are in contact with the upper surface of the transfer belt,
      a recovery box including a first communication passage connected to said first air outlet and said second air outlet, said first communication passage configured for receiving, from said first air outlet, the sludge dried on the transfer belt by the drying means and configured for receiving, from said second air outlet, the dried sludge remaining on said transfer belt and separated from the transfer belt by the roll brush, and
      a second communication passage for making communication between the recovery box and the blower fan.

2. The sludge drying apparatus according to claim 1, wherein the drying means further includes:
   an air inlet formed at one end of the drying box in the direction of extension thereof for introducing outside air into the drying box, and
   a dividing portion for dividing flow rate of the exhaust gas sucked from the air outlet through the recovery box by the blower fan into two parts.

3. The sludge drying apparatus according to claim 1, wherein the rotating means further comprises:
   a drive pulley mounted to an output shaft of a motor, wherein the motor is configured to rotate the drive pulley;
   a driven pulley mounted to a shaft of the roll brush; and
   a belt connected to the drive pulley and the driven pulley, wherein the belt rotates about the drive pulley and the driven pulley by the rotation of the drive pulley.

* * * * *